United States Patent
Thiyanaratnam et al.

(10) Patent No.: US 8,731,313 B2
(45) Date of Patent: May 20, 2014

(54) METHOD AND APPARATUS FOR ACCURATE COMPRESSION AND DECOMPRESSION OF THREE-DIMENSIONAL POINT CLOUD DATA

(75) Inventors: Pradeep Thiyanaratnam, Los Angeles, CA (US); Stanley Osher, Pacific Palisades, CA (US)

(73) Assignee: Level Set Systems, Inc., Palisades, CA (US)

( * ) Notice: Subject to any disclaimer, the term of this patent is extended or adjusted under 35 U.S.C. 154(b) by 800 days.

(21) Appl. No.: 12/727,183

(22) Filed: Mar. 18, 2010

(65) Prior Publication Data

US 2010/0239178 A1   Sep. 23, 2010

Related U.S. Application Data

(60) Provisional application No. 61/210,722, filed on Mar. 23, 2009.

(51) Int. Cl.
*G06K 9/46* (2006.01)

(52) U.S. Cl.
USPC ............ 382/240; 382/186; 382/107; 382/128

(58) Field of Classification Search
CPC ........... G06T 9/00; G06T 9/001; G06T 17/20; G06T 7/0051; G06F 17/30; G06F 17/30292
USPC ......... 382/232–236, 238–240, 242–243, 100, 382/284, 305, 103, 153, 307, 204; 345/419, 345/420, 427, 423

See application file for complete search history.

(56) References Cited

U.S. PATENT DOCUMENTS

| | | | |
|---|---|---|---|
| 5,748,199 A * | 5/1998 | Palm | 345/473 |
| 7,027,658 B2 * | 4/2006 | Osher et al. | 382/243 |
| 7,065,461 B2 * | 6/2006 | Chang et al. | 702/81 |
| 7,605,817 B2 * | 10/2009 | Zhang et al. | 345/473 |
| 7,729,541 B2 * | 6/2010 | Razdan et al. | 382/186 |
| 7,801,708 B2 * | 9/2010 | Unal et al. | 703/2 |

(Continued)

OTHER PUBLICATIONS

Sung-Bum Park et al.,., "Multiscale Representation and Compression of 3-D Point Data", published Jan. 8, 2009, pp. 177-187, IEEE Transactions on Multimedia, vol. 11, No. 1, Jan. 2009.*

(Continued)

*Primary Examiner* — Mekonen Bekele
(74) *Attorney, Agent, or Firm* — Che-Yang Chen; Law Office of Michael Chen

(57) ABSTRACT

This invention relates to a method and apparatus for accurate compression and decompression of data. More specifically, this invention relates to a method and apparatus for compressing three dimensional spatial points (so called "point cloud") and decompressing such data to produce an accurate point cloud. In one embodiment of the present invention, a level set based method is used to reconstruct a surface to approximate the surface of the point cloud. This reconstructed surface is defined implicitly as the zero level set of a function, which can be computed on a regular three-dimensional rectangular grid. Furthermore, the three-dimensional grid may be rearranged into a two-dimensional grid where the data are compressed and stored in a form of gradient. In order to recover the point cloud, the three-dimensional grid is rebuilt from the two-dimensional data and an interpolating algorithm on the implicit function is utilized to compute the points on the surface.

20 Claims, 12 Drawing Sheets

(56) References Cited

U.S. PATENT DOCUMENTS

| | | | |
|---|---|---|---|
| 7,956,862 B2* | 6/2011 | Zhang et al. | 345/473 |
| 2002/0190982 A1* | 12/2002 | Kotcheff et al. | 345/420 |
| 2004/0202369 A1* | 10/2004 | Paragios | 382/173 |
| 2005/0114059 A1* | 5/2005 | Chang et al. | 702/84 |
| 2005/0128197 A1* | 6/2005 | Thrun et al. | 345/421 |
| 2007/0036437 A1* | 2/2007 | Razdan et al. | 382/186 |
| 2008/0088626 A1* | 4/2008 | Habe et al. | 345/427 |
| 2008/0225045 A1* | 9/2008 | Birtwistle et al. | 345/420 |
| 2008/0275351 A1* | 11/2008 | Kirchberg et al. | 600/500 |
| 2010/0239178 A1* | 9/2010 | Osher et al. | 382/243 |

OTHER PUBLICATIONS

Sung-Bum Park et al., "Multiscale Surface Representation Scheme for Point Clouds", p. 232-237, 2004 IEEE., pp. 232-237.*

C. Baillard et al., "Robust Adaptive Segmentation of 3D Medical Images with Level", pp. 1-29, published Nov. 2000.*

* cited by examiner

_US 8,731,313 B2_

METHOD AND APPARATUS FOR ACCURATE COMPRESSION AND DECOMPRESSION OF THREE-DIMENSIONAL POINT CLOUD DATA

CROSS-REFERENCE OF RELATED APPLICATION

This application claims priority under 35 USC §119 (e) to U.S. Provisional Patent Application Ser. No. 61/210,722, filed on Mar. 23, 2009, the entire contents of which are hereby incorporated by reference.

FIELD OF THE INVENTION

This invention relates to a method and apparatus for accurate compression and decompression of data. More specifically, this invention relates to a method and apparatus for compressing three dimensional spatial points (so called "point cloud") and decompressing the compressed data to approximate the original point cloud.

BACKGROUND OF THE INVENTION

Recently, high resolution LIDAR (Light Detection And Ranging) scans of terrain data have been collected using air and ground based scanners. LIDAR is an optical remote sensing technology that measures properties of scattered light to find range and/or other information of a distant target utilizing laser pulses to determine distance to an object or surface. Like the radar technology, which uses radio waves, the range to an object is determined by measuring the time delay between transmission of a pulse and detection of the reflected signal. LIDAR technology has application in archaeology, geography, geology, geomorphology, seismology, remote sensing and three-dimensional (3D) mapping.

A point cloud is a set of vertices in a three-dimensional coordinate system, which is often created by three-dimensional scanners, such as LIDAR systems which measure a large number of points on the surface of an object, and output the point cloud as a data file. The point cloud is a collection of three-dimensional spatial points, represents the visible surface of the object that has been scanned or digitized. For example in FIG. 1, a scatter plot of point cloud data from the scan of the "Happy Buddha" includes 543,652 points in the point cloud, which may cause storage and transmission of such huge data problematic.

U.S. Pat. No. 7,215,430 to Kacyra et al. discloses an integrated system for generating a model of a three-dimensional object, wherein a scanning laser device scans the three-dimensional object and generates a point cloud, a model is generated, responsive to the point cloud, representing constituent geometric shapes of the object, and a data file is generated, responsive to the model, which can be inputted to a computer-aided design system. Kacyra also discloses compression of video images. However, Kacyra does not disclose anything related to using the level set method to compress the point cloud data and store the data in a form of gradient, and to decompress the gradient data to accurately generate a point cloud which approximates the scanned point cloud.

U.S. Pat. No. 6,922,234 to Hoffman et al. discloses a method and apparatus to document the spatial relationships and geometry of existing buildings and structures. More specifically, Hoffman discloses a method and apparatus comprising a 3D camera (scanning laser range finder) which can produce high resolution reflectance images, a magnetic storage device which can store scanned measurement data, a set of algorithms which are used to interpret the measurement data, and a software interface which allows a human to interact and query the measurement information in useful ways. Like Kacyra, Hoffman does not disclose anything related to using the level set method to compress the point cloud data and store the data in a form of gradient, and to decompress the gradient data to accurately generate a point cloud which approximates the scanned point cloud.

Therefore, there remains a need for a new and improved apparatus and method for not only generating the point cloud data, but also accurately compressing and reconstructing the point cloud to ease storage and transmission of the data.

SUMMARY OF THE INVENTION

It is an object of the present invention to provide a method and system for accurately compressing three-dimensional point cloud data to ease storage and transmission of the data.

It is another object of the present invention to provide a method and system for accurately decompressing the point cloud data by reconstructing the point cloud which approximate the scanned point cloud.

It is a further object of the present invention to provide a method and system for accurately compressing and decompressing point cloud data by utilizing level set and partial differential equation (PDE) based method.

According to one aspect of the present invention, a method for compressing and decompressing three-dimensional point cloud data comprises the steps of receiving the point cloud data; managing said point cloud data to transform the point cloud data into a regular data set; storing the regular data set in the three-dimensional grid; rearranging the three-dimensional rectangular grid into a two-dimensional grid which includes the regular data set; compressing the regular data set in the two-dimensional grid by transforming the regular data set to compressed data set.

Furthermore, the decompression method comprises the steps of transforming compressed data set to the regular data set; rebuilding the three-dimensional grid including the regular data set, from the two-dimensional grid; and according to data in the regular data set, computing a plurality of points which approximate the point cloud data by interpolating the data in the regular data set.

In one embodiment, the step of managing the point cloud data includes the steps of determining an implicit function to construct a surface of the point cloud data; and computing said implicit function on a three-dimensional grid to transform the point cloud data to a regular data set. In a further embodiment, the implicit function is a level set function and the surface of the point cloud data is result of zero level set.

In a different embodiment, the step of computing said implicit function on a three-dimensional grid to transform the point cloud set to a regular data set includes the steps of finding a closest grid point corresponding to each point cloud data point; computing an exact distance value from the grid point to each point cloud data point; using the exact distance values as fixed boundary values for the Eikonal equation; and solving the Eikonal equation to create a regular data set including said distance values represented by a distance function.

In a further embodiment, the compressed data set includes gradient data. In an exemplary embodiment, the step of computing a plurality of points which approximate the point cloud data includes the step of interpolating the data in the regular data set represented by the distance function.

In another aspect, a system for compressing and decompressing three-dimensional point cloud data comprises means for receiving the point cloud data; a compression device comprising means for managing said point cloud data to transform said point cloud data into a regular data set; means for storing said regular data set in a three-dimensional grid; means for rearranging the three-dimensional rectangular grid into a two-dimensional grid which includes said regular data set; means for compressing said regular data set in the two-dimensional grid by transforming said regular data set to a compressed data set; and a decompression device comprising means for transforming said compressed data set to said regular data set; means for rebuilding the three-dimensional grid including the regular data set, from the two-dimensional grid; and means for computing a plurality of points which approximate the point cloud data, according to data in the regular data set.

In one embodiment, the means for managing the point cloud data includes means for determining an implicit function to construct a surface of the point cloud data; and means for computing said implicit function on a three-dimensional grid to transform the point cloud data to a regular data set. In a further embodiment, the implicit function is a level set function and the surface is result of zero level set.

In a different embodiment, the means for computing said implicit function on a three-dimensional grid to transform the point cloud set to a regular data set includes means for finding a closest grid point corresponding to each point cloud data point; means for computing an exact distance value from the grid point to each point cloud data point; means for using the exact distance values as fixed boundary values for the Eikonal equation; and means for solving the Eikonal equation to create a regular data set including said distance values represented by a distance function.

In a further embodiment, the compressed data set includes gradient data. In an exemplary embodiment, the means for computing a plurality of points which approximate the point cloud data includes the means for interpolating the data in the regular data set represented by the distance function.

The present invention together with the above and other advantages may best be understood from the following detailed description of the embodiments of the invention illustrated in the drawings below.

DETAILED DESCRIPTION OF THE INVENTION

Figure 1:
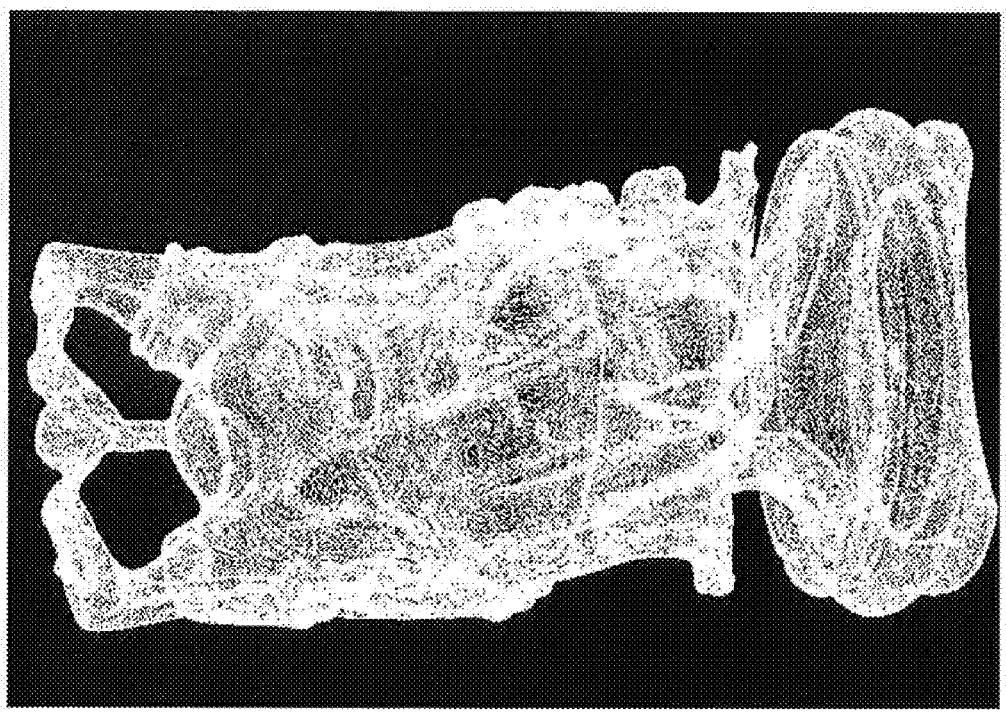
FIG. 1 illustrates a scatter plot of point cloud data from the scan of the Happy Buddha from the Stanford 3D Scanning Repository. There are 543,652 points in the point cloud.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications which might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

This invention relates to a method and apparatus for accurate compression and decompression of data. More specifically, this invention relates to a method and apparatus for compressing three dimensional spatial points (so called "point cloud") and decompressing such data to produce an accurate point cloud. As stated above, the point cloud is a collection of three-dimensional spatial points which cause storage and transmission of such data problematic. In one embodiment of the present invention, a level set based method is used to construct a surface to approximate the surface of the point cloud. This reconstructed surface is defined implicitly as the zero level set of a function, which can be computed on a regular three-dimensional rectangular grid. Furthermore, the three-dimensional grid may be rearranged into a two-dimensional grid where the data are compressed and stored in a form of gradient. In order to recover the point cloud, the three-dimensional grid is rebuilt from the two-dimensional data and an interpolating algorithm on the implicit function is utilized to compute the points on the surface. The mathematical model used in the present invention will be further discussed below in connection with FIGS. 1-6.

Level Set Method

The level set method is usually used to represent a surface implicitly. For example, if $\gamma$ is a surface, it can be represented as the zero isocontour of a level set function $\phi$, which is defined in one higher dimension than $\gamma$, i.e., $$\gamma = \{\vec{x} : \phi(\vec{x}) = 1\}$$

By using this implicit representation, surface deformation and complex topological changes can be handled easily. Moreover, the level set calculations can be performed numerically on regular rectangular grids.

Reconstruction of the Surface Using the Point Cloud

To compress the point cloud, it may be necessary to reconstruct the point cloud surface using the abovementioned level set method. In one embodiment, a weighted minimal surface model is adapted to reconstruct a surface from a point cloud, and a level set formulation used to evolve the level set function φ is:

$$\phi_t = |\nabla \phi| [\nabla d(\vec{x}) \cdot \vec{n} + d(\vec{x}) \kappa] \quad (1)$$

where $\vec{n}$ is the outer normal, κ is the mean curvature and d(x, y, z) is the distance to the point cloud data set. If the initial condition for φ is already computed, the level set function φ is evolved using equation (1) until it reaches equilibrium, and the zero level set of φ will be the reconstructed surface. Another level set reconstruction methods are available, for example, in T. Goldstein, X. Bresson and S. Osher, "Geometric Applications of the Split Bregman Problem; Segmentation and Surface Reconstruction", UCLA Math Department. CAM Report 09-06, (2009), which is incorporated herein by reference.

For example, there are 543, 652 points scattered in the point cloud shown in FIG. 1. To compress this huge point cloud data set, a reconstructed surface (200) has to be found. By utilizing the level set method stated above, assuming the initial condition for the level set function φ is already known, when the level set function φ is evolved using equation (1) reaches equilibrium, the zero level set of φ will be the reconstructed surface 200 illustrated in FIG. 2.

Once the point cloud data set is read into a memory device, a discrete computational domain must be chosen, for example, a regular rectangular grid of size M×N×P with uniform mesh spacing may be used. The grid size can be an important parameter in the compression process, and is determined by the sampling density and total number of data points. Generally speaking, if a grid cell size is chosen to accommodate five to ten data points, the compression/decompression process should produce a point cloud that is similar in size to the original.

In order to compute the distance function to the data on the grid, a method to find the closest grid point to each data point and compute the exact distance value from the grid point to the data point may have to be implemented. These exact distance values are then used as fixed boundary values for the Eikonal equation $|\nabla d(x, y, z)| = 1$. The solution to this equation will be a distance function to the data points defined on the grid. In one embodiment, a fast sweeping method may be used in the present invention (H. K. Zhao, "Fast Sweeping Method for Eikonal Equations", Math. Comp, v74, (2005), pp 623-627, which is incorporated herein by reference). In different embodiments, other Eikonal solvers can also be used.

Figure 2:
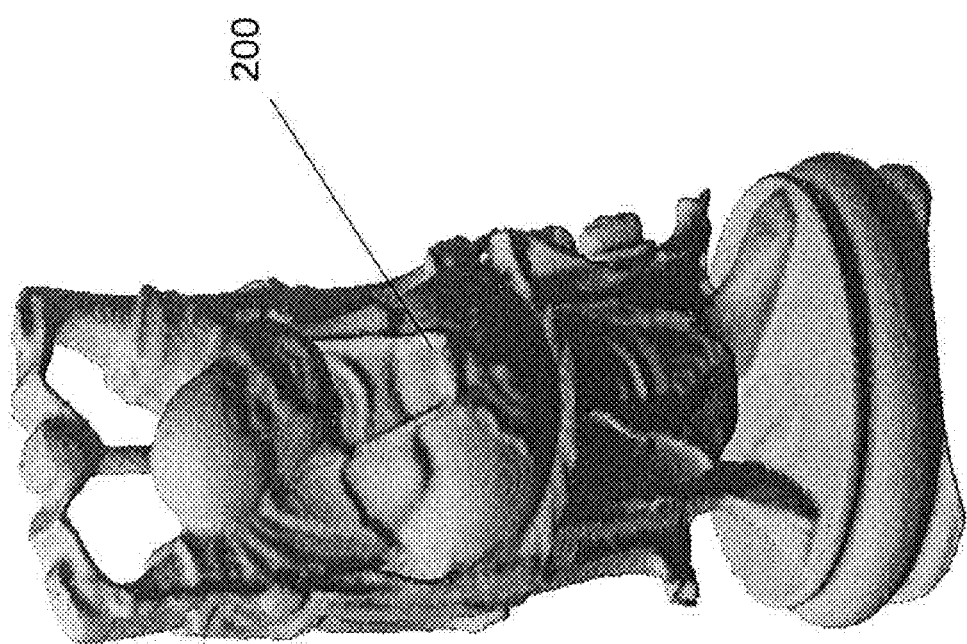
FIG. 2 illustrates a reconstructed surface of the Happy Buddha in FIG. 1 (150×150×351 grid).
Figure 3:
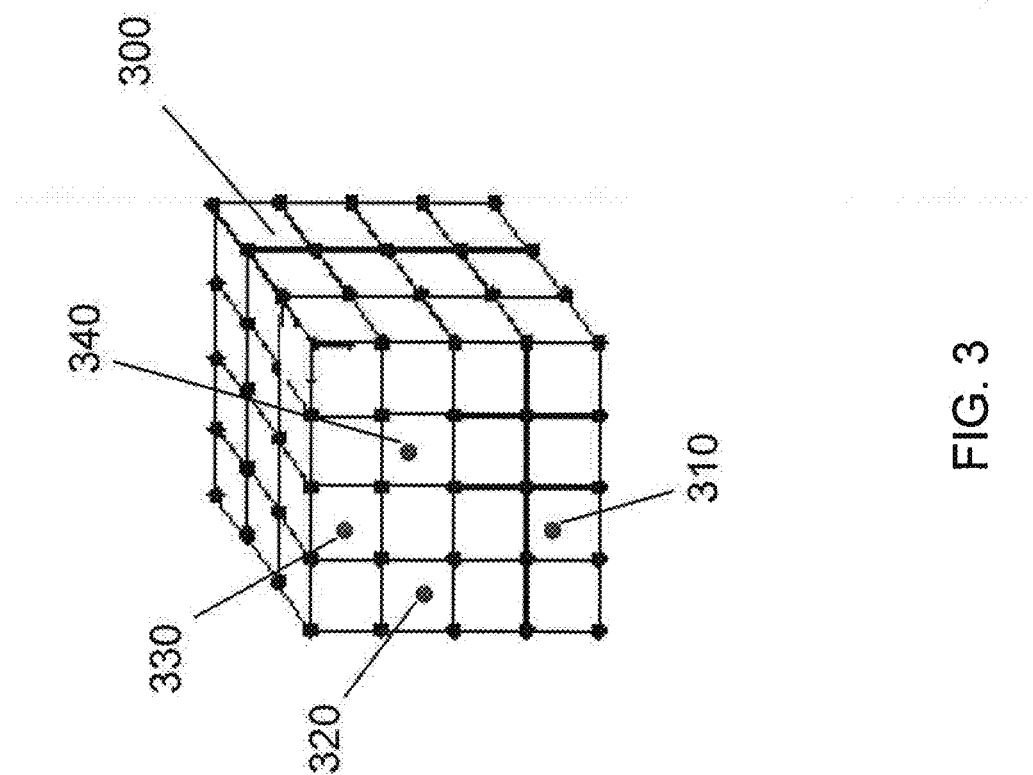
FIG. 3 illustrates a portion of the three-dimensional grid in the present invention.

Referring to the Happy Buddha in FIG. 2, the reconstructed surface 200 may be enclosed by 150×150×351 grid. A portion (300) of such grids and some point cloud data points (310 to 340) are shown in FIG. 3. In one embodiment, the closest grid point to each data point (310 to 340) may be found to compute the distance from the grid point to the data point, and the distance values satisfies the Eikonal equation $|\nabla d(x, y, z)| = 1$ as stated above.

An initial value for the level set function φ may be computed for equation (1). A good initial value is an outer contour of the distance function, d(x, y, z)=ε, where ε has to be large enough so that the outer contour contains all of the data points. However, a very large value will take longer to converge to the final reconstructed surface. Thus, the sampling density of the data will play an important role in choosing the outer contour level. If the ε is too small, it may result in isolated spheres and an inaccurate reconstructed surface. In one embodiment, an appropriate ε may be obtained by the process of trial and error.

Once the outer contour of d has been computed for the initial value of φ, the process of evolving the surface toward the final reconstructed surface can be initiated. It is more efficient to first use a modified version of equation (1) that uses only the convection term and ignores the curvature term. Therefore, the level set function φ can be evolved under the following equation (called convection equation) until equilibrium is reached:

$$\phi_t = \nabla d \cdot \nabla \phi \quad (2)$$

The equation (1) can be used to evolve the level set function further, which may result in a smoother surface. For terrain data, experimental results have shown that using the convection equation (2) alone is sufficient to produce an acceptable reconstructed surface. There are two important numerical considerations. First is that the level set computations should be done in a narrow band around the zero level set. Second, the level set function should be reinitialized to a distance function for each convection time step. (D. Peng, B. Merriman, S. Osher, H. K. Zhao, and M. Kang. "A PDE based fast local level set method." *J. Comp. Phys*, 155:410-438, 1999, which is incorporated herein by reference.)

Rearranging the Three-Dimensional Grid to a Two-Dimensional Grid and Compressing the Data As mentioned above, the level set function φ can be defined on the regular rectangular grid of size M×N×P. In order to compress the information of the level set function φ, the three-dimensional grid may be rearranged into a large two-dimensional grid. In one embodiment, the two-dimensional grid may consist of P horizontal slices of the three-dimensional grid tiled together. Let P=P1*P2 be a factorization of P, and the tiling will consist of P1×P2 tiles of size M×N, making a large two-dimensional grid of size (P1*M)×(P2*N). This large two-dimensional grid can be treated as two-dimensional terrain data, which can be compressed by utilizing any two-dimensional compression method. For example in FIG. 5, if the level set function can be define on a grid (500) of size 5×5×5, the three-dimensional grid 500 may be rearranged to a two-dimensional grid 510 of size 5×25, to compress the information of the level set function φ thereon.

Figure 4:
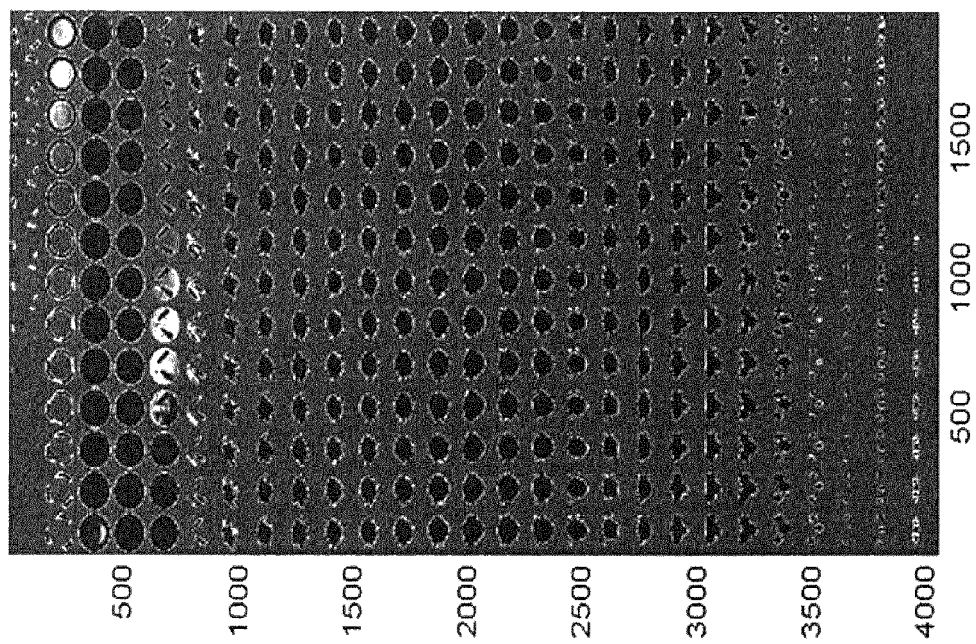
FIG. 4 depicts the three-dimensional grid being rearranged into a large two-dimensional grid.
Figure 5:
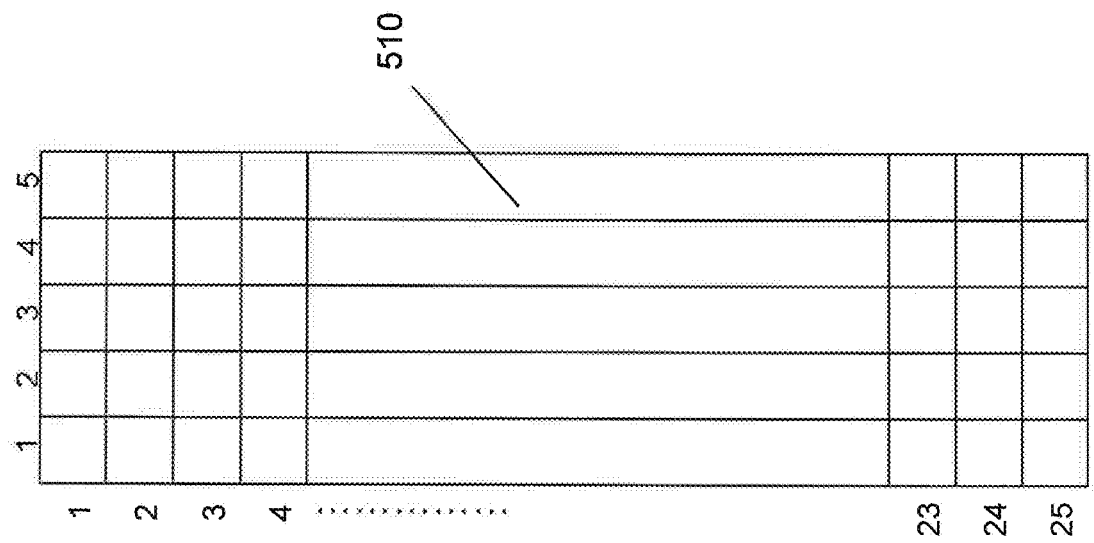
FIG. 5 illustrates an example of rearranging a three-dimensional grid into a two-dimensional grid.
Figure 5:
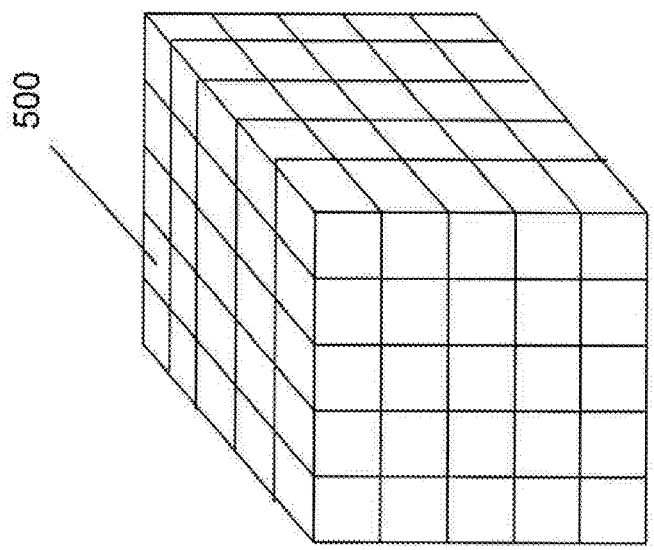

In one embodiment, a compression method in U.S. Pat. No. 7,027,658 to Osher et al. (which is incorporated herein by reference) discloses a method to generate a gradient of an original surface and compression of the data representing the gradient. An alternative embodiment includes taking a second gradient of the original surface before compression, in which case reconstruction yields the second gradient, from which the first gradient can also be recovered. As can be seen in FIGS. 4 and 5, the three-dimensional grid (enclosing the Happy Buddha) can be rearranged into a two-dimensional grid, and can be compressed as a JPEG (or other standard two-dimensional image format) to ease storage and or transmission. It is noted that the factorization P=P1*P2 may have to be stored.

Decompressing the Data

Figure 6:
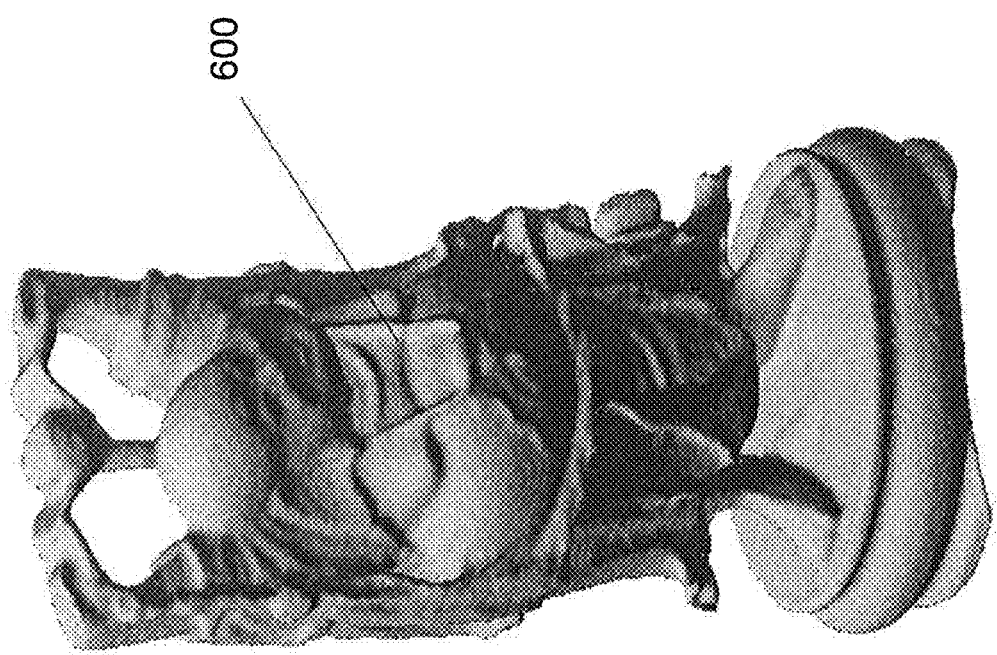
FIG. 6 illustrates a reconstructed surface after compression and decompression processes in the present invention.

The data compressed by utilizing the method in U.S. Pat. No. 7,027,658 can be decompressed by rebuilding the three-dimensional grid, and an interpolation procedure is used to compute the points on the surface. Referring to FIG. 6, a surface 600 (of Happy Buddha) is reconstructed when the three-dimensional grid (150×150×351) is rebuilt. As discussed above, since the level set function is a distance function, and there is a reinitialization procedure used during the evolution of the surface, interpolating points on the surface becomes easy and accurate. In one embodiment, a marching tetracubes algorithm is adapted to compute the points on the reconstructed surface. (B. Carneiro, C. Silva, A. Kaufman., "Tetra-Cubes: An algorithm to generate 3D isosurfaces based upon tetrahedra," *Anais do IX SIBGRAPI*, pp 205-210, 1996, which is incorporated herein by reference.)

Figure 7:
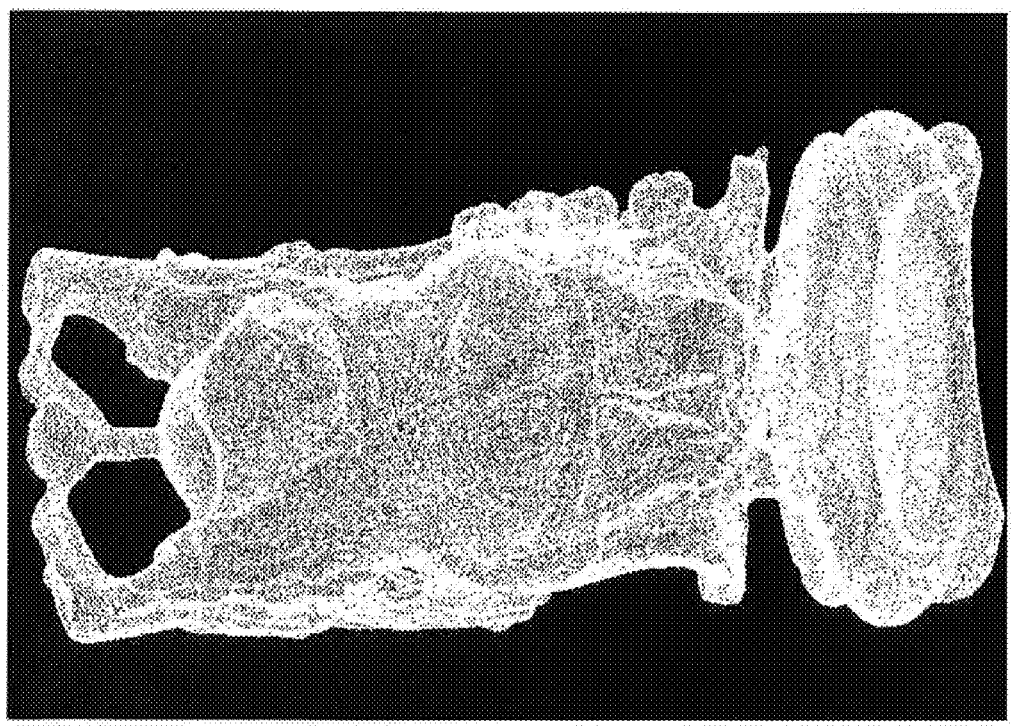
FIG. 7 illustrates point cloud data extracted from the decompressed data through interpolation of the level set function.

FIG. 7 illustrates point cloud data (including 501,898 points) extracted from the decompressed data through interpolation of the level set function. It is noted that the method and system for compressing and decompressing point cloud data may not produce "exact" point cloud data created by the scanner, instead the present invention is to produce "accurate" point cloud data which approximate the scanner point cloud data.

Figure 8:
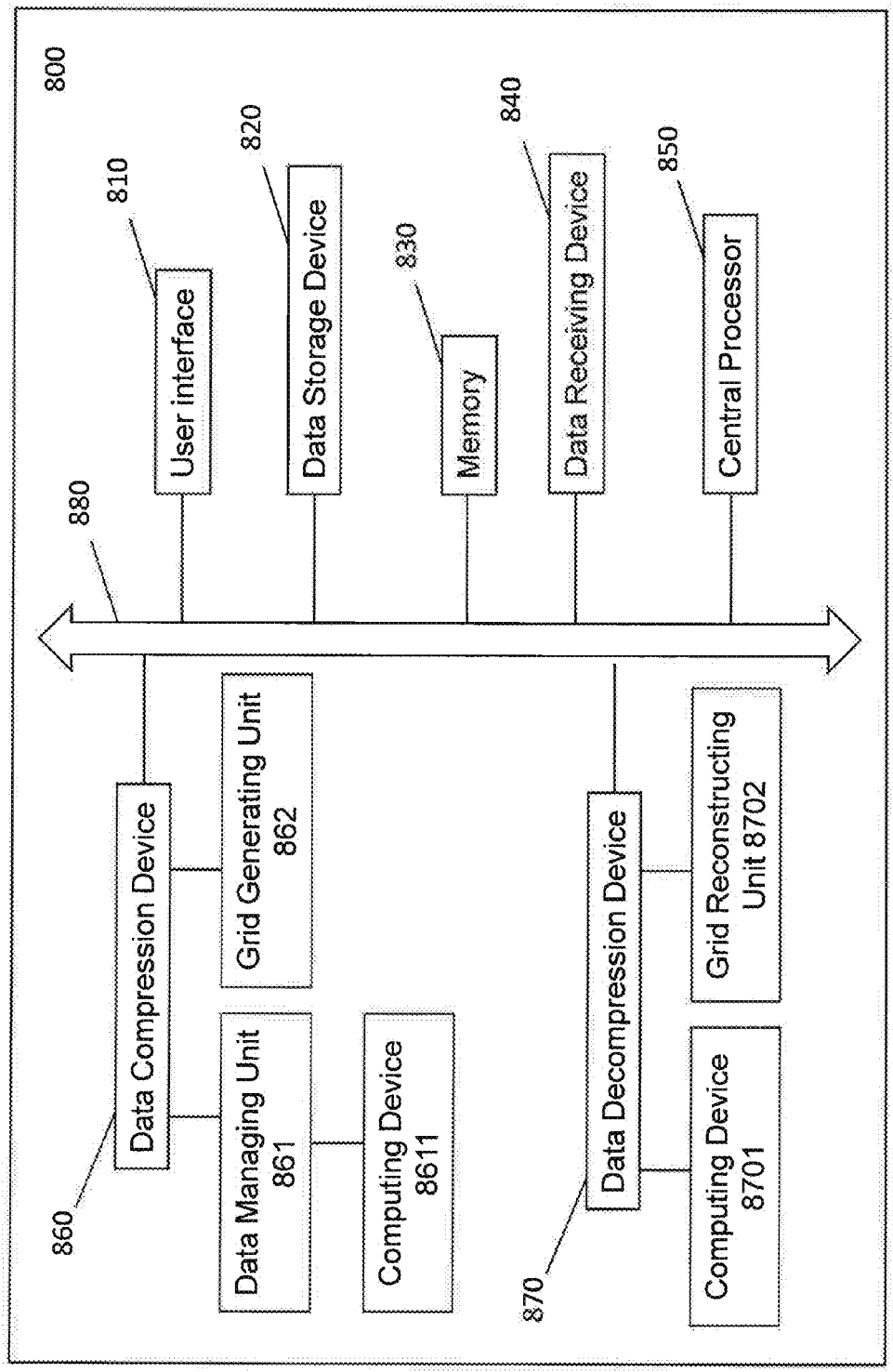
FIG. 8 illustrates a functional block diagram showing an example of structure of a system implementing the method for compressing and decompressing the point cloud data in the present invention.

In one aspect of the present invention illustrated in FIG. 8, a system 800 for accurately compressing and decompressing three-dimensional point cloud data may include a user interface 810 (such as display, mouse, keyboard, etc.), a data storage device 820 such as a hard disc, CD-ROM, DVD or other storage means to store the data loaded or generated in the present in the system, and memory 830. In one embodiment, the memory 830 may include a buffer memory for temporary storing data for ease of data processing, a ROM for storing various control programs and a RAM for storing a processing result such as the compressed data set in the present invention.

The system 800 may include a data receiving device 840 for loading the point cloud data into the system, a central processor 850 for controlling an overall operation of the system, a data compression device 860 and a data decompression device 870. The system 800 may also include a bus 880 for interfacing the above units or devices in the system.

The data compression device 860 is configured to compress the point cloud data received from the data receiving device 840. In one embodiment, the data compression device 860 may include a data managing unit 861 to transform the point cloud data into different formats which is easy to be stored and transmitted, a grid generating unit 862 configured to generate a three-dimensional grid and a corresponding two-dimensional grid to store the data (with different formats) transformed from the point cloud data.

In one embodiment, the data managing unit 861 may include a computing device 8611 to determine an implicit function to construct a surface of the point cloud data (such as the Happy Buddha in FIG. 2) and compute such implicit function on the three-dimensional grid to transform the point cloud data to a regular data set, which may be easier to be further processed than the original point cloud data. More specifically, the computing device 8611 may find a closest grid point corresponding to each point cloud data point and compute an exact distance value from the grid point to each point cloud data point. The computing device 8611 may further use the exact distance values as fixed boundary values to solve the Eikonal equation $|\nabla d(x, y, z)|=1$ to create a regular data set including the distance values represented by a distance function. In an exemplary embodiment, the implicit function is a level set function and the surface is result of zero level set.

After rearranging the three-dimensional grid to the two-dimensional grid (such as the example in FIG. 5), the regular data set including the distance value may be further compressed by using the method in U.S. Pat. No. 7,027,658 to Osher et al, which discloses a method to generate a gradient of a surface and compression of the data representing the gradient. As can be seen above, since the distance value from the grid point to each point cloud data point is constant to satisfy the Eikonal equation, further compressing such data by taking gradient thereof may significantly increase efficiency for data storage and transmission, as well as further processing.

The data decompression device 870 may include a computing device 8701 and a grid reconstructing device 8702, where the computing device 8701 is configured to transform the compressed data set (i.e. gradient data) to the regular data set (distance), and the grid reconstructing device 8702 is configured to rebuild the three-dimensional grid (from the two-dimensional grid) which includes the distance information, such that the computing device 8701 can compute a plurality of points approximating the original point cloud data, according to the distance information, as illustrated in FIG. 7. In an exemplary embodiment, the computing device 8701 is configured to interpolate the data in the regular data set represented by the distance function. Again, the system 800 in the present invention may not generate the "exact" point cloud created by the scanner, instead the system is configured to generate an "accurate" point cloud which approximates the original.

Figure 9:
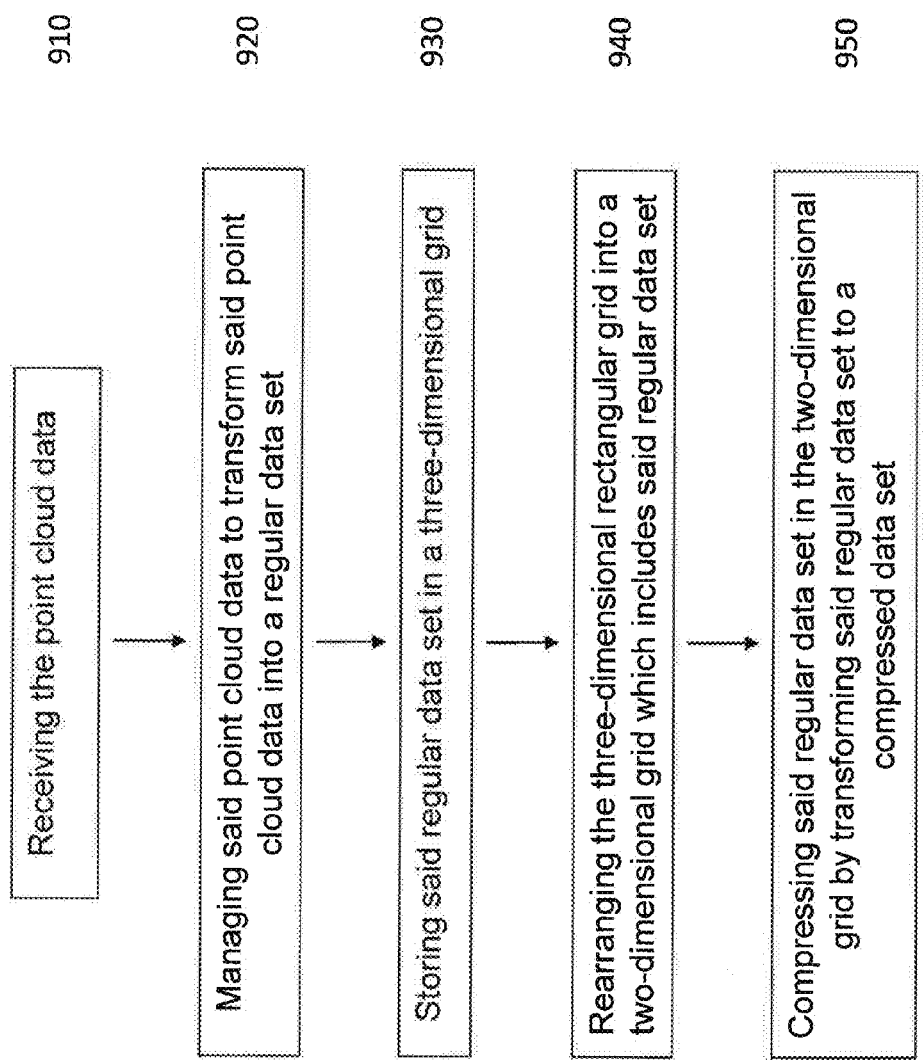
FIGS. 9 and 9a illustrates a method for compressing and decompressing the point cloud data in the present invention.

In one aspect of the present invention illustrated in FIG. 9, a method for compressing and decompressing three-dimensional point cloud data comprises the steps of receiving the point cloud data 910; managing the point cloud data to transform the point cloud data into a regular data set 920; storing said regular data set in a three-dimensional grid 930; rearranging the three-dimensional rectangular grid into a two-dimensional grid which includes said regular data set 940; and compressing said regular data set in the two-dimensional grid by transforming said regular data set to a compressed data set 950.

Figure 9A:
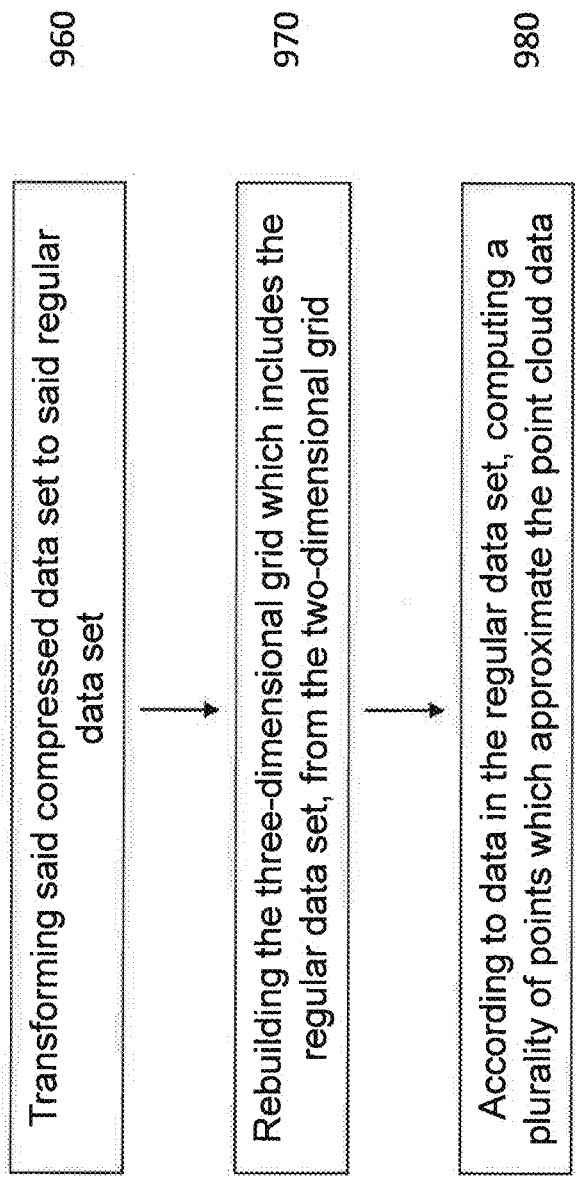
Figure 9B:
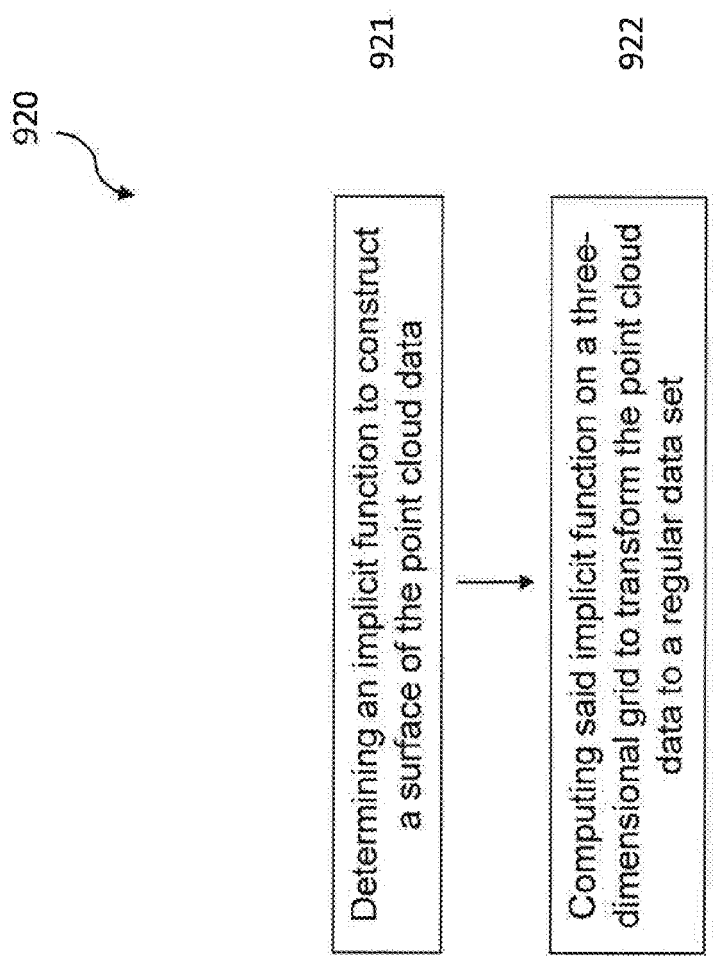
FIG. 9b illustrates one embodiment of the method shown in FIG. 9.

In one embodiment shown in FIG. 9b, the step of managing the point cloud data 920 includes the steps of determining an implicit function to construct a surface of the point cloud data 921; and computing said implicit function on a three-dimensional grid to transform the point cloud data to a regular data set 922. In another embodiment, the implicit function is a level set function. As mentioned above, the level set function is used to reconstruct the Happy Buddha surface 200. If the initial condition for the level set is already computed, the level set function is evolved using equation (1) (shown above) until it reaches equilibrium, and the zero level set will be the reconstructed surface. The surface may be further enclosed by a three-dimensional grid where the point cloud data may be transformed into distance data from the grid point to each point cloud data, which is more regular and easier to be processed than the original point cloud data.

Figure 9C:
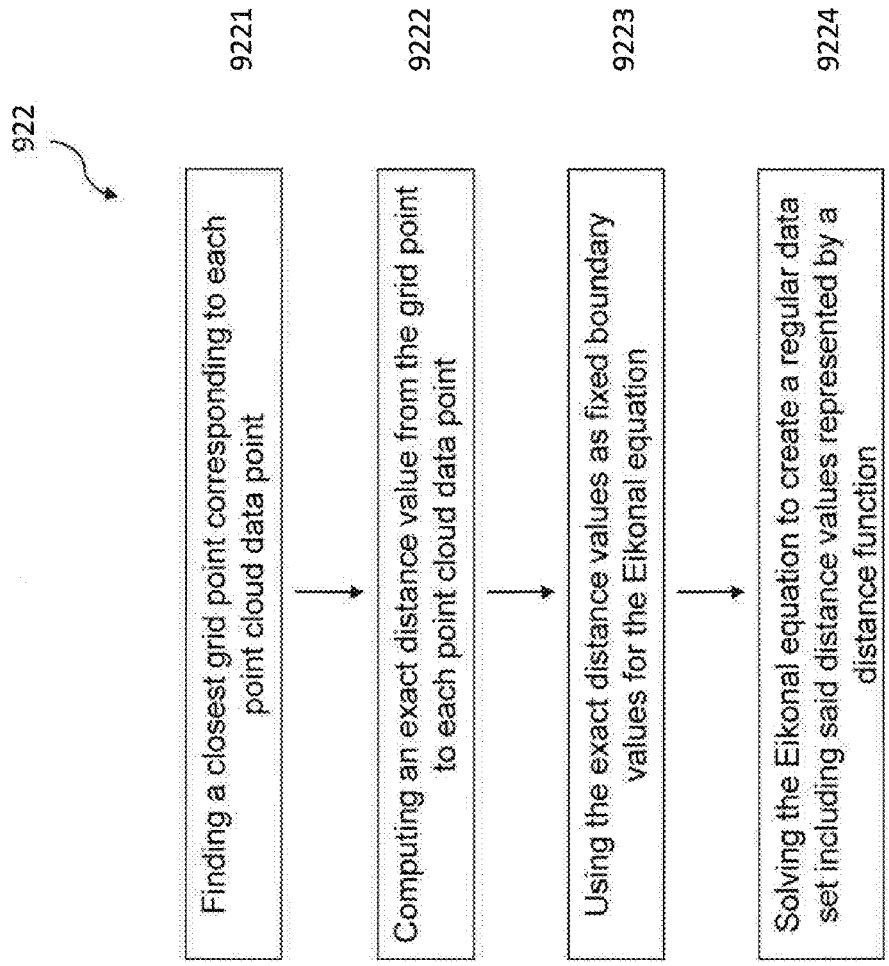
FIG. 9c shows a further embodiment of the method shown in FIG. 9b.

In a further embodiment depicted in FIG. 9c, the step of computing said implicit function on a three-dimensional grid to transform the point cloud set to a regular data set 922 includes the steps of finding a closest grid point corresponding to each point cloud data point 9221; computing an exact distance value from the grid point to each point cloud data point 9222; using the exact distance values as fixed boundary values for the Eikonal equation 9223; and solving the Eikonal equation to create a regular data set including said distance values represented by a distance function 9224.

In steps 940 and 950, the three-dimensional data may be rearranged into a two-dimensional grid as shown in FIG. 4, where the distance data can be further processed by taking gradient thereof to generate a compressed data set which can be easily stored and transmitted.

As can be seen in FIG. 9a, the decompression method in the present invention may include the steps of transforming said compressed data set to said regular data set 960; rebuilding the three-dimensional grid which includes the regular data set, from the two-dimensional grid 970; and according to data in the regular data set, computing a plurality of points which approximate the point cloud data 980.

In step 960, the computing device 8701 in the data compression device 870 may transform the compressed data set (i.e. gradient data) to the regular data set (distance), and the grid reconstructing device 8702 may rebuild the three-dimensional grid (from the two-dimensional grid) which includes the distance in step 970, such that in step 980, the computing device 8701 can compute a plurality of points approximating the original point cloud data, according to the distance information, as shown in FIG. 7. In an exemplary embodiment, the step of computing a plurality of points which approximate the point cloud data 980 includes the step of interpolating the data in the regular data set represented by the distance function.

Having described the invention by the description and illustrations above, it should be understood that these are exemplary of the invention and are not to be considered as limiting. Accordingly, the invention is not to be considered as limited by the foregoing description, but includes any equivalents.

The invention claimed is:

1. A method for compressing and decompressing three-dimensional point cloud data comprises the steps of:
   receiving the point cloud data;
   managing said point cloud data to transform said point cloud data into a regular data set;
   storing said regular data set in a three-dimensional grid of size M×N×P, wherein M, N, P each represents size of each dimension of said three-dimensional grid;
   rearranging the three-dimensional grid into a two-dimensional grid which includes said regular data set, wherein the two-dimensional grid includes M×N×P grids therein;
   compressing said regular data set in the two-dimensional grid by transforming said regular data set to a compressed data set; and
   retrieving the point cloud data by utilizing a decompression method, said method comprising the steps of:
   transforming said compressed data set to said regular data set;
   rebuilding the three-dimensional grid which includes the regular data set, from the two-dimensional grid; and
   according to data in the regular data set, computing a plurality of points which approximate the point cloud data.

2. The method of claim 1, wherein the step of managing the point cloud data includes the steps of determining an implicit function to construct a surface of the point cloud data; and computing said implicit function on a three-dimensional grid to transform the point cloud data to a regular data set.

3. The method of claim 2, wherein the implicit function is a level set function and the surface is result of zero level set.

4. The method of claim 2, wherein the step of computing said implicit function on a three-dimensional grid to transform the point cloud set to a regular data set includes the steps of finding a closest grid point corresponding to each point cloud data point; computing an exact distance value from the grid point to each point cloud data point; using the exact distance values as fixed boundary values for the Eikonal equation; and solving the Eikonal equation to create a regular data set including said distance values represented by a distance function.

5. The method of claim 1, wherein the compressed data set includes gradient data.

6. The method of claim 4, wherein the step of computing a plurality of points which approximate the point cloud data includes the step of interpolating the data in the regular data set represented by the distance function.

7. A system for compressing and decompressing three-dimensional point cloud data comprises:
   means for receiving the point cloud data;
   a compression device for compressing the point cloud data, comprising:
   means for managing said point cloud data to transform said point cloud data into a regular data set;
     means for storing said regular data set in a three-dimensional grid of size M×N×P, wherein M, N, P each represents size of each dimension of said three-dimensional grid;
     means for rearranging the three-dimensional grid into a two-dimensional grid which includes said regular data set, wherein the two-dimensional grid includes M×N×P grids therein;
     means for compressing said regular data set in the two-dimensional grid by transforming said regular data set to a compressed data set; and
   a decompression device configured for retrieving the point cloud data, comprising:
     means for transforming said compressed data set to said regular data set;
     means for rebuilding the three-dimensional grid including the regular data set, from the two-dimensional grid; and
     means for computing a plurality of points which approximate the point cloud data, according to data in the regular data set.

8. The system of claim 7, wherein said means for managing the point cloud data includes means for determining an implicit function to construct a surface of the point cloud data; and means for computing said implicit function on a three-dimensional grid to transform the point cloud data to a regular data set.

9. The system of claim 8, wherein said implicit function is a level set function and the surface is result of zero level set.

10. The system of claim 8, wherein said means for computing said function on a three-dimensional grid to transform the point cloud data to a regular data set includes means for finding a closest grid point corresponding to each point cloud data point; means for computing an exact distance value from the grid point to each point cloud data point; means for using the exact distance values as fixed boundary values for the Eikonal equation; and means for solving the Eikonal equation to create a regular data set including said distance values represented by a distance function.

11. The system of claim 7, wherein the compressed regular data set includes gradient data.

12. The system of claim 10, wherein said means for computing a plurality of points which approximate the point cloud data includes means for interpolating the data in the regular data set represented by the distance function.

13. A system comprising a computer-readable storage device that stores computer-executable instructions which, when executed by a processor, perform operations comprising:
   receiving the point cloud data;
   managing said point cloud data to transform said point cloud data into a regular data set;
   storing said regular data set in a three-dimensional grid of size M×N×P, wherein M, N, P each represents size of each dimension of said three-dimensional grid;
   rearranging the three-dimensional grid into a two-dimensional grid that includes said regular data set, wherein the two-dimensional grid includes M×N×P grids therein;
   compressing said regular data set in the two-dimensional grid by transforming said regular data set to a compressed data set; and retrieving the point cloud data by utilizing a decompression method, said method comprising the steps of:

transforming said compressed data set to said regular data set;

rebuilding the three-dimensional grid which includes the regular data set, from the two-dimensional grid; and according to data in the regular data set, computing a plurality of points which approximate the point cloud data.

14. The system of claim 13, wherein managing the point cloud data includes determining an implicit function to construct a surface of the point cloud data; and computing said implicit function on a three-dimensional grid to transform the point cloud data to a regular data set.

15. The system in claim 14, wherein the implicit function is a level set function and the surface is result of zero level set.

16. The system of claim 14, wherein computing said implicit function on a three-dimensional grid to transform the point cloud set to a regular data set includes the steps of finding a closest grid point corresponding to each point cloud data point; computing an exact distance value from the grid point to each point cloud data point; using the exact distance values as fixed boundary values for the Eikonal equation; and solving the Eikonal equation to create a regular data set including said distance values represented by a distance function.

17. The system of claim 13, wherein the compressed data set includes gradient data.

18. The system of claim 16, wherein computing a plurality of points which approximate the point cloud data includes interpolating the data in the regular data set represented by the distance function.

19. The method of claim 3, wherein the step of computing said implicit function on a three-dimensional grid to transform the point cloud set to a regular data set includes the steps of finding a closest grid point corresponding to each point cloud data point; computing an exact distance value from the grid point to each point cloud data point; using the exact distance values as fixed boundary values for the Eikonal equation; and solving the Eikonal equation to create a regular data set including said distance values represented by a distance function.

20. The system of claim 9, wherein said means for computing said function on a three-dimensional grid to transform the point cloud data to a regular data set includes means for finding a closest grid point corresponding to each point cloud data point; means for computing an exact distance value from the grid point to each point cloud data point; means for using the exact distance values as fixed boundary values for the Eikonal equation; and means for solving the Eikonal equation to create a regular data set including said distance values represented by a distance function.

* * * * *